United States Patent
Hiyoshi et al.

(10) Patent No.: US 12,087,508 B2
(45) Date of Patent: Sep. 10, 2024

(54) CAPACITOR WITH FIXING BUS BAR AND CAPACITOR CASE INCLUDING RIB FOR SECURING STRENGTH OF THE CAPACITOR

(71) Applicants: DENSO CORPORATION, Kariya (JP); NICHICON CORPORATION, Kyoto (JP)

(72) Inventors: Ryota Hiyoshi, Kariya (JP); Hiroaki Imi, Kyoto (JP); Yasuyuki Murakami, Kyoto (JP)

(73) Assignees: DENSO CORPORATION, Kariya (JP); NICHICON CORPORATION, Kyoto (JP)

( * ) Notice: Subject to any disclaimer, the term of this patent is extended or adjusted under 35 U.S.C. 154(b) by 272 days.

(21) Appl. No.: 17/710,345

(22) Filed: Mar. 31, 2022

(65) Prior Publication Data
US 2022/0223342 A1 Jul. 14, 2022

Related U.S. Application Data

(63) Continuation of application No. PCT/JP2020/036175, filed on Sep. 25, 2020.

(30) Foreign Application Priority Data

Oct. 2, 2019 (JP) .................... 2019-181861

(51) Int. Cl.
*H01G 2/04* (2006.01)
*H01G 2/10* (2006.01)
*H01G 4/224* (2006.01)

(52) U.S. Cl.
CPC ............. *H01G 2/04* (2013.01); *H01G 2/10* (2013.01); *H01G 2/103* (2013.01); *H01G 4/224* (2013.01)

(58) Field of Classification Search
CPC ................. H01G 2/103; H01G 2/04
See application file for complete search history.

(56) References Cited

FOREIGN PATENT DOCUMENTS

| JP | 2006-216618 A | 8/2006 | |
|----|---|---|---|
| JP | 2006332493 A | * 12/2006 | ............. H01G 4/224 |
| JP | 2008-130640 A | 6/2008 | |
| JP | 2009105108 A | * 5/2009 | |
| JP | 2010251399 A | * 11/2010 | |
| JP | 2012-044097 A | 3/2012 | |
| JP | 2013-161864 A | 8/2013 | |
| KR | 1020110086385 A | * 7/2011 | |

OTHER PUBLICATIONS

Dec. 1, 2020 International Search Report issued in International Patent Application No. PCT/JP2020/036175.

* cited by examiner

*Primary Examiner* — David M Sinclair
(74) *Attorney, Agent, or Firm* — Oliff PLC (57) ABSTRACT

A capacitor includes: a capacitor element; a pair of bus bars; a capacitor case; and a sealing member. The capacitor element includes a pair of electrode surfaces. Each of the pair of bus bars is connected to a corresponding one of the pair of electrode surfaces. The capacitor element and the pair of bus bars are arranged in the capacitor case. The sealing member is charged in the capacitor case. The sealing member seals the capacitor element. The capacitor case includes a rib extended from a part of the capacitor case to an inside of the capacitor case. One of the pair of bus bars serves as a fixing bus bar, the fixing bus bar includes a direct fixing portion to be directly fixed to the rib.

13 Claims, 6 Drawing Sheets

CAPACITOR WITH FIXING BUS BAR AND CAPACITOR CASE INCLUDING RIB FOR SECURING STRENGTH OF THE CAPACITOR

CROSS-REFERENCE TO RELATED APPLICATION

The present application is a continuation application of International Application No. PCT/JP2020/036175, filed on Sep. 25, 2020, which claims priority to Japanese Patent Application No. 2019-181861, filed on Oct. 2, 2019. The contents of these applications are incorporated herein by reference in their entirety.

BACKGROUND

Technical Field

The present disclosure relates to a capacitor.

Background Art

A capacitor is disclosed, the capacitor including a capacitor case having an opening portion on a first side thereof, a plurality of capacitor elements housed in the capacitor case, a pair of bus bars connected respectively to a pair of electrode surfaces of each of the capacitor elements, and a sealing member that is charged into the capacitor case through the opening portion and that seals the capacitor elements.

SUMMARY

In the present disclosure, provided is a capacitor as the following.

The capacitor including a capacitor element, a pair of bus bars, a capacitor case and a sealing member. The capacitor case includes a rib extended from a part of the capacitor case to an inside of the capacitor case. At least one of the pair of bus bars serves as a fixing bus bar, and the fixing bus bar includes a direct fixing portion to be directly fixed to the rib. The capacitor case includes a fixed portion for allowing the capacitor case to be fixed to another member, and the capacitor case includes a first portion where the fixed portion is formed, and the rib is formed on an inner surface of the first portion of the capacitor case.

BRIEF DESCRIPTION OF THE DRAWINGS

The above-described object, other objects, features, and advantages of the present disclosure become more apparent in light of the following detailed description with reference to the following accompanying drawings.

DETAILED DESCRIPTION OF THE PREFERRED EMBODIMENTS

[PTL 1] JP 2013-161864 A

From a viewpoint of increasing strength of capacitors, there is still room for improvement of the capacitor disclosed in Patent Literature 1. In recent years, height reduction of capacitors, that is, thickness reduction of capacitors has been requested. Meanwhile, there is a risk that strength of capacitors is liable to decrease along with height reduction of capacitors. In view of such circumstances, in order that the request for height reduction of capacitors is satisfied, a structure in which strength of capacitors is easily secured has been demanded.

The present disclosure has been made to provide a capacitor for which strength is easily secured.

According to a first aspect of the present disclosure, there is provided a capacitor including:

a capacitor element that includes a pair of electrode surfaces;

a pair of bus bars each of which is connected to a corresponding one of the pair of electrode surfaces;

a capacitor case in which the capacitor element and the pair of bus bars are arranged; and a sealing member that is charged in the capacitor case and that seals the capacitor element, the capacitor case includes a rib extended from a part of the capacitor case to an inside of the capacitor case, at least one of the pair of bus bars serves as a fixing bus bar, and the fixing bus bar includes a direct fixing portion to be directly fixed to the rib, the capacitor case includes a fixed portion for allowing the capacitor case to be fixed to another member, and the capacitor case includes a first portion where the fixed portion is formed, and the rib is formed on an inner surface of the first portion of the capacitor case.

According to a second aspect of the present disclosure, there is provided a capacitor including:

a capacitor element that includes a pair of electrode surfaces;

a pair of bus bars each of which is connected to a corresponding one of the pair of electrode surfaces;

a capacitor case in which the capacitor element and the pair of bus bars are arranged; and a sealing member that is charged in the capacitor case and that seals the capacitor element, the capacitor case includes a rib extended from a part of the capacitor case to an inside of the capacitor case, at least one of the pair of bus bars serves as a fixing bus bar, and the fixing bus bar includes a direct fixing portion to be directly fixed to the rib, an inner surface of the capacitor case includes a first surface portion where the rib is formed and a second surface portion which is adjacent to the first surface portion, and the first surface portion is formed to be curved to protrude outward relative to the second surface portion.

The capacitor case of the capacitor according to the above-described aspect includes the rib extended from a part of the capacitor case to the inside of the capacitor case. Thus, strength of the capacitor case is easily increased. Further, the fixing bus bar being the at least one of the bus bars includes the direct fixing portion to be directly fixed to the rib. With this, the fixing bus bar is fixed to a portion of the capacitor case where strength is relatively easily secured. In addition, the capacitor case is reinforced by the fixing bus bar fixed to the capacitor case. In this way, overall strength of the capacitor can be secured.

As described above, according to the above-described aspect, the capacitor for which strength is easily secured can be provided.

Embodiment

A capacitor according to an embodiment is described with reference to FIG. 1 to FIG. 6.

Figure 1:
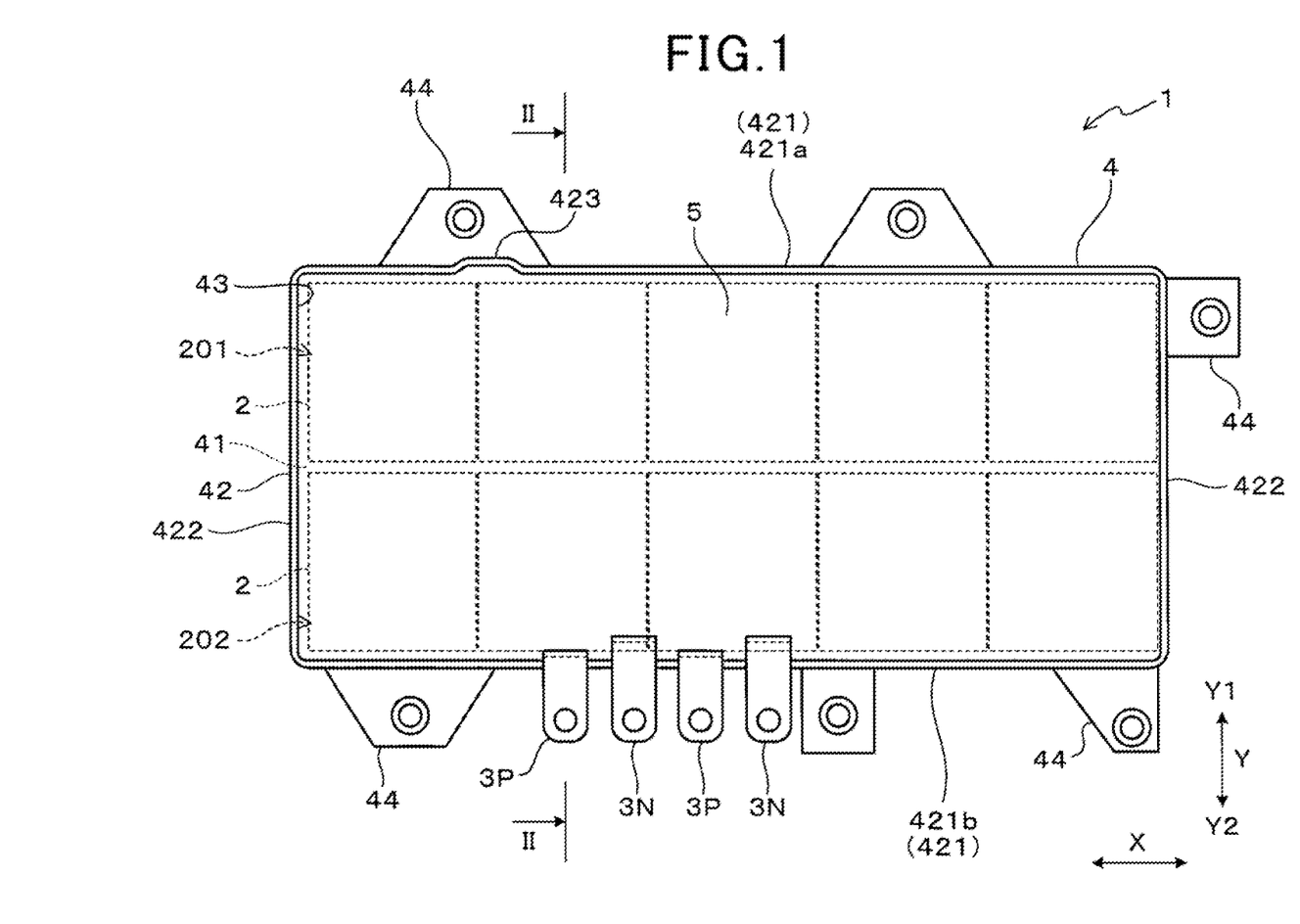
FIG. 1 is a plan view of a capacitor according to an embodiment.
Figure 2:
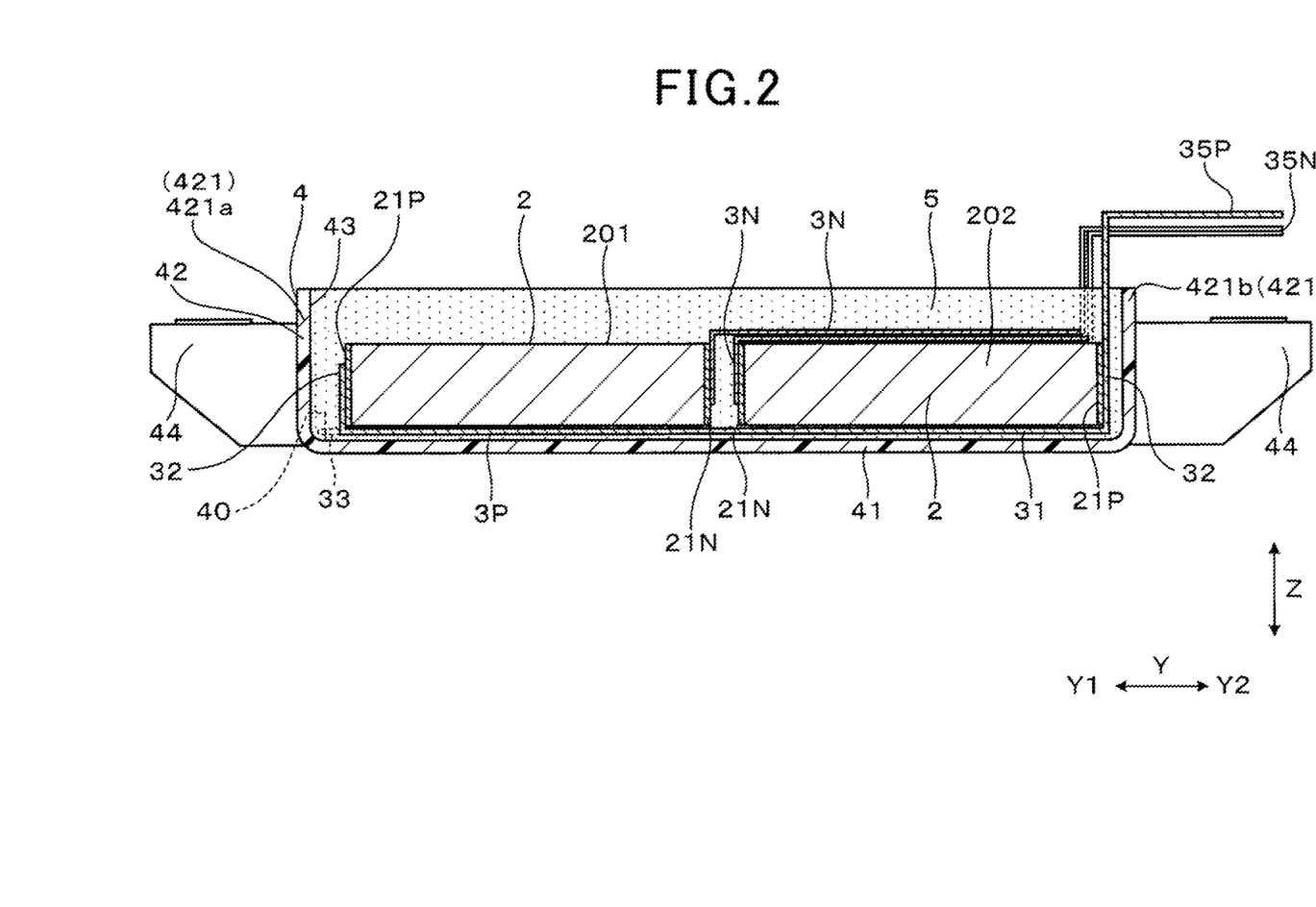
FIG. 2 is a cross-sectional view as viewed in a direction indicated by arrows 11-Il in FIG. 1.

As illustrated in FIG. 1 and FIG. 2, this capacitor 1 according to this embodiment includes capacitor elements 2, a pair of bus bars 3P and 3N, a capacitor case 4, and a sealing member 5. Note that, in FIG. 1, positions of outlines of the capacitors 2 are indicated by broken lines.

As illustrated in FIG. 2, the capacitor elements 2 each include a pair of electrode surfaces 21P and 21N. The pair of bus bars 3P and 3N are connected to the electrode surfaces 21P and 21N of each of the capacitor elements 2. The capacitor elements 2 and the pair of bus bars 3P and 3N are arranged in the capacitor case 4. The sealing member 5 is charged in the capacitor case 4. The sealing member 5 seals the capacitor elements 2.

Figure 5:
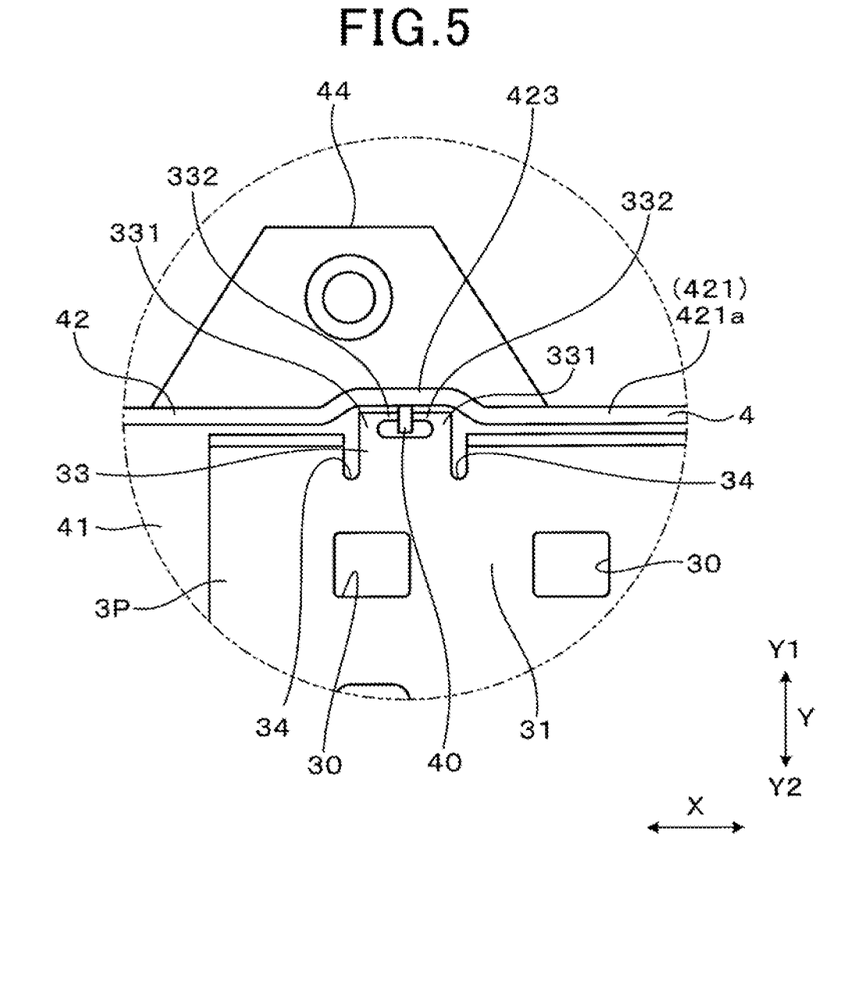
FIG. 5 is an enlarged plan view of a vicinity of a rib of the capacitor case and a direct fixing portion of the fixing bus bar according to the embodiment.
Figure 6:
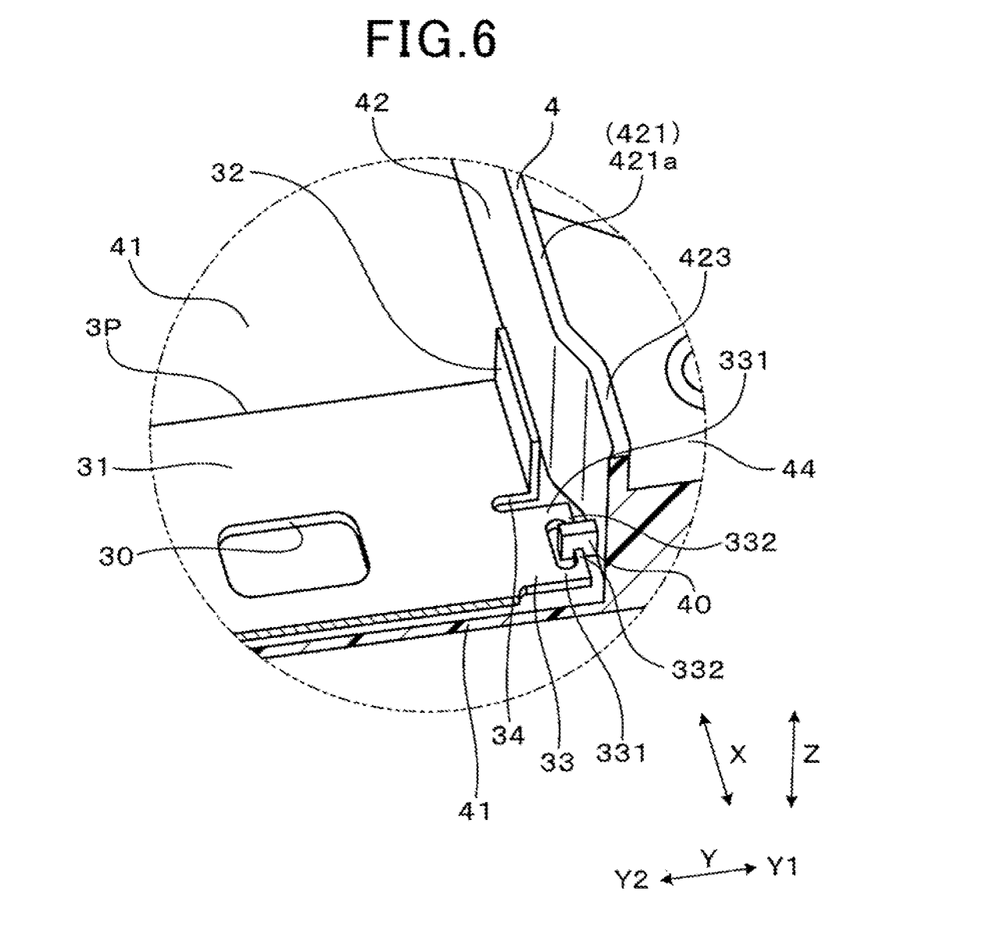
FIG. 6 is an enlarged perspective view of the vicinity of the rib of the capacitor case and the direct fixing portion of the fixing bus bar according to the embodiment.

As illustrated in FIG. 5 and FIG. 6, the capacitor case 4 includes a rib 40 extended from a part of the capacitor case 4 to an inside of the capacitor case 4. The fixing bus bar 3P, which is one of the bus bars 3P and 3N, includes a direct fixing portion 33 to be directly fixed to the rib 40. The direct fixing portion 33 is fixed to the rib 40 while in direct abutment with the rib 40.

Hereinbelow, the embodiment is described in detail.

The capacitor 1 may be, for example, a constituent part of a power conversion apparatus. The power conversion apparatus may be an in-vehicle power conversion apparatus to be mounted to vehicles such as electric vehicles and hybrid vehicles. The power conversion apparatus is arranged between a DC power supply and a three-phase AC motor (none of which is shown). The capacitor 1 smooths a DC voltage to be applied from a side where the DC power supply is present, and then outputs the smoothed DC voltage to a side where a switching circuit is present. The switching circuit converts the DC voltage to an AC voltage. The power conversion apparatus applies the AC voltage generated in this way to the three-phase AC motor.

The capacitor elements 2 may each be, for example, a film capacitor that is formed by winding a metallized film and that has the electrode surfaces 21P and 21N formed by metal spraying at both end portions in an axis direction in which the winding is performed. A plurality of capacitor elements 2 are provided as the capacitor elements 2 of the capacitor 1 according to this embodiment. Specifically, as illustrated in FIG. 2 and FIG. 3, the capacitor 1 according to this embodiment is a capacitor in which arrangement of the plurality of capacitor elements 2 is contrived such that the capacitor 1 is reduced in overall height (that is, reduced in thickness).

Figure 3:
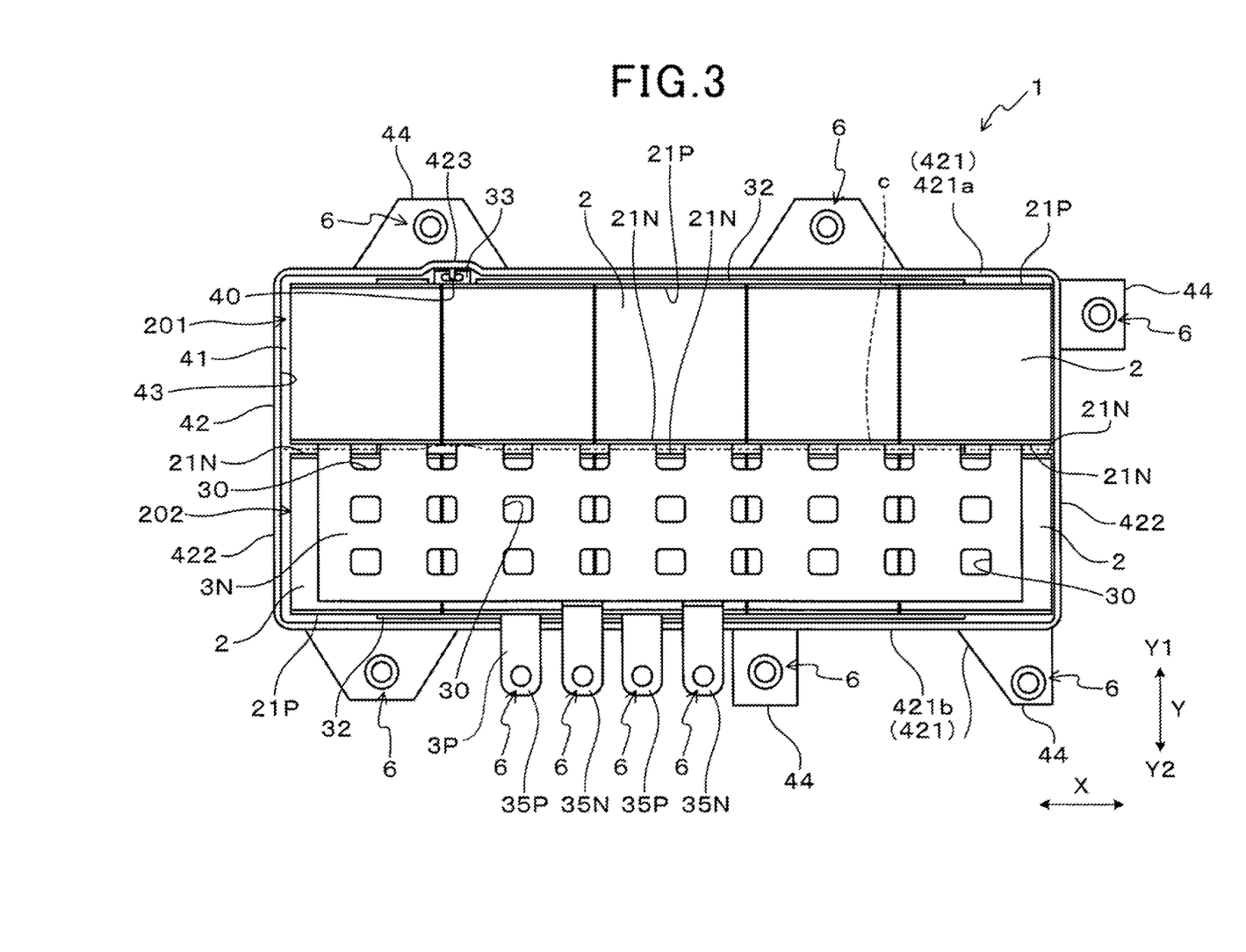
FIG. 3 is a plan view of the capacitor according to the embodiment in a state in which a sealing member is removed.

As illustrated in FIG. 2 and FIG. 3, in the capacitor 1 according to this embodiment, the plurality of capacitor elements 2 are arrayed in two rows along a longitudinal direction of the capacitor 1 with their electrode surfaces 21N to serve as negative electrodes facing each other in a transverse direction of the capacitor 1. The capacitor elements 2 are each liable to be elongated in the direction in which its pair of electrode surfaces 21P and 21N face each other. As a countermeasure, by adopting such arrangement, the capacitor 1 can be reduced in height. Note that, hereinbelow, a thickness direction of the capacitor 1 is referred to as a Z-direction, the longitudinal direction of the capacitor 1 is referred to as an X-direction, and the transverse direction of the capacitor 1 is referred to as a Y-direction. The plurality of capacitor elements 2 are housed in the capacitor case 4.

Figure 4:
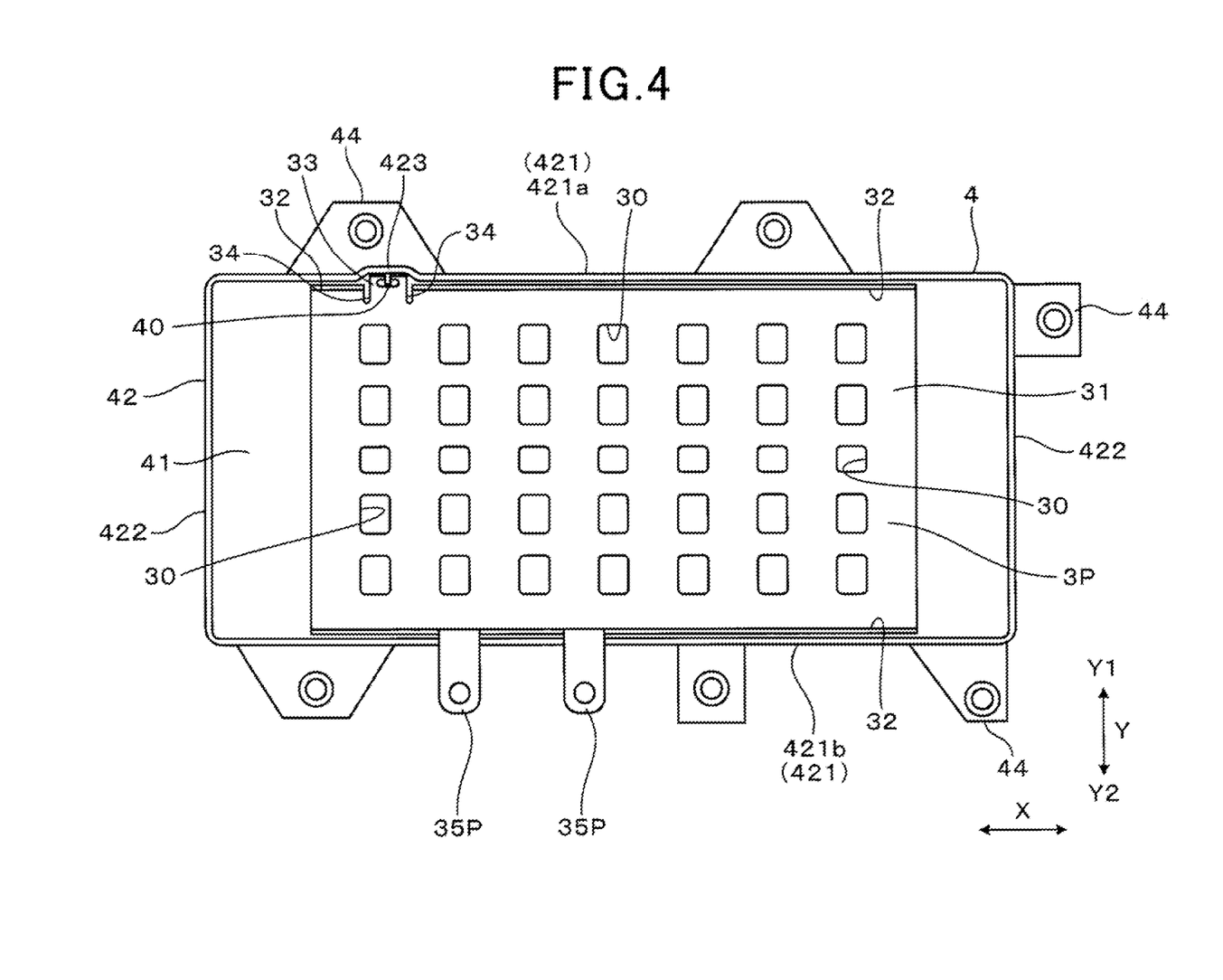
FIG. 4 is a plan view of a capacitor case and a fixing bus bar according to the embodiment.

As illustrated in FIG. 2 and FIG. 4, the capacitor case 4 is formed into a shape of a box opened on a first side in the Z-direction. The capacitor case 4 is made, for example, of an electrically-insulating thermoplastic resin. The capacitor case 4 has a bottom wall 41, a side wall 42 provided upright from the bottom wall 41, and an opening portion 43 on a first side of the side wall 42, the first side being opposite to a second side where the bottom wall 41 is provided. The bottom wall 41 exhibits a rectangular shape with a longitudinal direction in the X-direction and a transverse direction in the Y-direction. The side wall 42 is protruded from a periphery of the bottom wall 41 onto the first side in the Z-direction, and includes a first pair of facing wall portions being wall portions facing each other in the Y-direction, and a second pair of facing wall portions being wall portions facing each other in the X-direction. Hereinbelow, of the side wall 42, the first pair of facing wall portions facing each other in the Y-direction are referred to as long side walls 421, and the second pair of facing wall portions facing each other in the X-direction are referred to as short side walls 422. The long side walls 421 are formed to extend in the X-direction, and the short side walls 422 are formed to extend in the Y-direction. A length in the X-direction of each of the long side walls 421 is larger than a length in the Y-direction of each of the short side walls 422.

As illustrated in FIG. 1 to FIG. 4, the side wall 42 is provided with fixed portions 44 protruding to an outside of the capacitor case 4. The fixed portions 44 have a function to enable the capacitor case 4 to be mounted to other members. For example, the capacitor 1 is fastened with bolts through the fixed portions 44 to an apparatus case (not shown) forming an outer shell of the power conversion apparatus.

As illustrated in FIG. 1, FIG. 3, and FIG. 4, in this embodiment, six fixed portions 44 are provided as the fixed portions 44 of the capacitor 1. Of the six fixed portions 44, two are provided to one of the long side walls 421, another three are provided to another one of the long side walls 421, and still another one is provided to one of the short side walls 422. In this embodiment, of the pair of long side walls 421, the long side wall 421 on which the two fixed portions 44 are formed is referred to as a first long side wall 421a, and the long side wall 421 on which the another three fixed portions 44 are provided is referred to as a second long side wall 421b. In addition, one side in the Y-direction, specifically, the side where the first long side wall 421a is provided as viewed from the side where the second long side wall 421b is provided is referred to as a Y1-side, and the side where the second long side wall 421b is provided as viewed from the side where the first long side wall 421a is provided is referred to as a Y2-side. The fixed portion 44 provided on the short side wall 422 is provided on an end portion on the Y1-side of the short side wall 422.

As illustrated in FIG. 5 and FIG. 6, a recessed portion 423 is formed in the first long side wall 421a. The recessed portion 423 protrudes to an outside in the Y-direction (that is, Y1-side) relative to adjacent wall portions in the X-direction of the first long side wall 421a. In this way, an inner surface of the recessed portion 423 is recessed. The recessed portion 423 is formed at the part of the first long side wall 421a where the fixed portion 44 is provided. The recessed portion 423 is formed all over the first long side wall 421a in the Z-direction.

In addition, the rib 40 is formed in the recessed portion 423. Specifically, the surface portion of inner surfaces of the capacitor case 4 where the rib 40 is formed (that is, the inner surface of the recessed portion 423) is formed to be curved to protrude to the outside of the capacitor case 4 relative to the portions adjacent to the surface portion. The capacitor case 4 includes a wall portion where the fixed portion 44 is formed, and the rib 40 is formed on an inner surface of the wall portion of the capacitor case 4.

The rib 40 is formed integrally with the first long side wall 421a and the bottom wall 41. In other words, the rib 40 is formed together with the bottom wall 41, the side wall 42, and the like at a time of molding the capacitor case 4. The rib 40 is formed into a shape of a plate having a thickness in the X-direction.

As illustrated in FIG. 6, the rib 40 is formed locally at an end portion of the first long side wall 421a in the Z-direction, the end portion being on a side where the bottom wall 41 is present. Note that, the rib 40 may be formed at other parts. In addition, as illustrated in FIG. 2 and FIG. 3, the rib 40 is formed at a position facing the capacitor element 2 in the Y-direction. Specifically, at least a part of the rib 40 is arranged at a position overlapped with at least a part of the capacitor element 2 in the Y-direction. Note that, in FIG. 2, projections in the X-direction of shapes of an outline of the rib 40 and an outline of the direct fixing portion 33 are indicated by broken lines. In addition, as described above, the fixing bus bar 3P is directly fixed to the rib 40.

As illustrated in FIG. 2, the fixing bus bar 3P is a positive bus bar to be electrically connected to the electrode surfaces 21P on a positive side of the capacitor elements 2. Note that, a negative bus bar to be electrically connected to the electrode surfaces 21N on a negative side of the capacitor elements 2 may be used as the fixing bus bar. As illustrated in FIG. 2 and FIG. 4, the fixing bus bar 3P includes a bus-bar bottom surface portion 31 formed along the bottom wall 41 of the capacitor case 4, and bus-bar side surface portions 32 extended from a first end of the bus-bar bottom surface portion 31 to the opening side in the Z-direction of the capacitor case 4.

As illustrated in FIG. 2, the bus-bar bottom surface portion 31 is interposed between the bottom wall 41 of the capacitor case 4 and the plurality of capacitor elements 2. The bus-bar bottom surface portion 31 is arranged to face the bottom wall 41 of the capacitor case 4 across a slight gap. With this, the sealing member 5 is arranged also in a minute region between the bus-bar bottom surface portion 31 and the bottom wall 41 of the capacitor case 4. Although not shown, an insulating member such as an insulating sheet is arranged between the bus-bar bottom surface portion 31 and the respective electrode surfaces 21N on the negative side of the capacitor elements 2. In such a way, electrical insulation is secured. As illustrated in FIG. 4 to FIG. 6, the direct fixing portion 33 is extended from the bus-bar bottom surface portion 31 of the fixing bus bar 3P to the Y1-side.

The direct fixing portion 33 allows the rib 40 of the capacitor case 4 to be press-fitted therein. With this, the direct fixing portion 33 is directly fixed to the rib 40. The direct fixing portion 33 is formed to protrude to the Y1-side relative to adjacent parts of the bus-bar bottom surface portion 31. At least a part of the direct fixing portion 33 faces a part of the capacitor element 2 in the Z-direction. In other words, at least a part of the direct fixing portion 33 is arranged at a position overlapped with the capacitor element 2 in the Z-direction.

As illustrated in FIG. 5 and FIG. 6, at a Y1-side end portion of the direct fixing portion 33, a pair of first parts 331 extended from both end portions in the X-direction of the direct fixing portion 33 to the Y1-side, and a pair of second parts 332 extended from respective end portions on the Y1-side of the first parts 331 to sides facing each other are provided. The pair of second parts 332 are formed to face each other across a gap in the X-direction. In addition, the rib 40 is press-fitted in the gap between the pair of second parts 332. With this, the fixing bus bar 3P and the rib 40 are directly fixed to each other.

At parts of the bus-bar bottom surface portion 31 which are adjacent to both sides of the rib 40 in the X-direction, slits 34 which are formed in a manner that an edge on the Y1-side of the bus-bar bottom surface portion 31 is recessed to the Y2-side are provided. By forming these slits 34, in forming the fixing bus bar 3P, for example, by bending a flat sheet metal, the direct fixing portion 33 can be prevented from being deformed in conjunction with bending of boundary portions between the bus-bar side surface portion 32 and the bus-bar bottom surface portion 31, the boundary portions being adjacent to the direct fixing portion 33.

As illustrated in FIG. 2 and FIG. 4, of the pair of bus-bar side surface portions 32 formed on both sides in the Y-direction, a first bus-bar side surface portion 32 formed on the Y1-side faces an inner surface of the first long side wall 421a, and a second bus-bar side surface portion 32 formed on the Y2-side faces an inner surface of the second long side wall 421b. With this, as illustrated in FIG. 2, the bus-bar bottom surface portion 31 and the bus-bar side surface portions 32 on both the sides in the Y-direction of the fixing bus bar 3P has a U-shape as viewed in the X-direction.

As illustrated in FIG. 2 and FIG. 3, the capacitor elements 2 are arrayed in the two rows which are the Y1 side row and the Y2 side row. The capacitor elements 2 constituting the Y1 side row serve as a first-row element group 201 and the capacitor elements 2 constituting the Y2 side row serve as a second-row element group 202. The first bus-bar side surface portion 32 is connected to the respective electrode surfaces 21P on the Y1-side of the first-row element group 201. The second bus-bar side surface portion 32 is connected to the respective electrode surfaces 21P on the Y2-side of the second-row element group 202. Note that, unlike the bus-bar side surface portions 32, the direct fixing portion 33 is not connected to the capacitor elements 2.

As illustrated in FIG. 4, bus-bar terminal portions 35P for allowing the fixing bus bar 3P to be electrically connected to switching elements of the switching circuit in the power conversion apparatus are extended from the second bus-bar side surface portion 32. In other words, as viewed from the opening side in the Z-direction of the capacitor case 4, the bus-bar terminal portions 35P are formed in a region on the side opposite to the side where the direct fixing portion 33 is formed. As illustrated in FIG. 2, the bus-bar terminal portions 35P project to the opening side in the Z-direction of the capacitor case 4, and are formed farther to the Y2-side than the capacitor case 4 extends.

As illustrated in FIG. 2, the bus bars 3N, which are negative, are connected to the respective electrode surfaces 21N on the negative side of the capacitor elements 2 (that is, the electrode surfaces 21N facing the second-row element group 202, of the electrode surfaces 21P and 21N of the capacitor elements 2 constituting the first-row element group 201, and the electrode surfaces 21N facing the first-row element group 201, of the electrode surfaces 21P and 21N of the capacitor elements 2 constituting the second-row element group 202). In this embodiment, a first negative bus bar 3N and a second negative bus bar 3N are arranged as the negative bus bars 3N. The first negative bus bar 3N is connected to the respective electrode surfaces 21N on the negative side of the plurality of capacitor elements 2 constituting the first-row element group 201, and the second negative bus bar 3N is connected to the respective electrode surfaces 21N on the negative side of the plurality of capacitor elements 2 constituting the second-row element group 202.

The first negative bus bar 3N and the second negative bus bar 3N are arranged in a manner of being overlapped with each other in the Z-direction at a position on the opening side of the capacitor case 4 in the Z-direction of the second-row element group 202.

Bus-bar terminal portions 35N for respectively allowing the negative bus bars 3N to be electrically connected to the switching elements are formed on respective first sides of the negative bus bars 3N, the first sides each being opposite to a second side which is connected to the capacitor elements 2. The bus-bar terminal portions 35N project to the opening side of the capacitor case 4 in the Z-direction, and are formed farther to the Y2-side than the capacitor case 4 extends. Two bus-bar terminal portions 35N are provided as the bus-bar terminal portions 35N of each of the negative bus bars 3N, and the bus-bar terminal portions 35N of each of the negative bus bars 3N are arranged in the manner of being overlapped with each other in the Z-direction.

As illustrated in FIG. 3, regions on both sides of a center position "c" between the pair of long side walls 421 in a direction (that is, Y-direction) in which the pair of long side walls 421 face each other include a first region and a second region, the first region having fewer fixed points 6 for an external member than the second area, and the rib 40 and the direct fixing portion 33 are located in the first region. In this embodiment, in the region on the Y1-side relative to the center position "c", there are three fixed portions 44 for allowing the capacitor case 4 to be fixed to the apparatus case of the power conversion apparatus. Meanwhile, in a region on the Y2-side relative to the center position "c", in addition to three fixed portions 44, the bus-bar terminal portions 35P and 35N for allowing the bus bars 3P and 3N to be connected to other members (such as bus bars (not shown) for allowing the capacitor 1 and the switching elements to be connected to each other) are formed at four points. In other words, in the region on the Y2-region relative to the center position "c" the fixation points 6 for allowing the capacitor 1 to be fixed to other members are present at seven points. In addition, in this embodiment, the rib 40 and the direct fixing portion 33 are arranged in the region on the Y1-side relative to the center position "c".

Although not shown, an insulating member for securing electrical insulation between the fixing bus bar 3P and the negative bus bars 3N is arranged in a region where the fixing bus bar 3P and the negative bus bars 3N are electrically close to each other (for example, between the bus-bar terminal portions 35P of the fixing bus bar 3P and the bus-bar terminal portions 35N of the negative bus bars 3N). As illustrated in FIG. 1 and FIG. 2, the sealing member 5 is charged in the capacitor case 4.

The sealing member 5 is made, for example, of an electrically-insulating thermosetting resin. The sealing member 5 under a high-temperature fluidized state is charged into the capacitor case 4, and then is cured by being heated. An end portion of the sealing member 5 on the opening side of the capacitor case 4 is formed at a position equivalent to that of the opening portion 43 of the capacitor case 4. The sealing member 5 seals the plurality of capacitor elements 2. With this, humidity resistance of the capacitor elements 2 is secured.

Further, as illustrated in FIG. 3 and FIG. 4, a plurality of through-holes 30 for allowing the fluidized sealing member 5 to pass therethrough are formed through each of the bus bars (specifically, fixing bus bar 3P and two negative bus bars 3N). In other words, although the sealing member 5 is viscous to some extent in being charged into the capacitor case 4, the through-holes 30 provided through the bus bars 3P and 3N facilitates a spread of the sealing member 5 throughout the inside of the capacitor case 4.

Now, functions and advantages of this embodiment are described.

The capacitor case 4 of the capacitor 1 according to this embodiment includes the rib 40 extended from part of the capacitor case 4 to the inside of the capacitor case 4. Thus, strength of the capacitor case 4 is easily increased. Further, the fixing bus bar 3P, being the at least one of the bus bars 3P and 3N, includes the direct fixing portion 33 to be directly fixed to the rib 40. With this, the fixing bus bar 3P is fixed to a portion of the capacitor case 4 where strength is relatively easily secured. In addition, the capacitor case 4 is reinforced by the fixing bus bar 3P fixed to the capacitor case 4. In this way, strength of the capacitor 1 as a whole can be secured. Still further, the sealing member 5 is interposed between the fixing bus bar 3P and the capacitor case 4. With this, a degree of the reinforcement of the capacitor case 4 by the fixing bus bar 3P can be increased. At this time, since the fixing bus bar 3P is directly fixed to the capacitor case 4, the capacitor elements 2 can be accurately positioned relative to the capacitor case 4.

Yet further, the capacitor case 4 includes a first portion where the fixed portion 44 is formed, and the rib is formed on the inner surface of the first portion of the capacitor case 4. Thus, heat of the capacitor elements 2 is easily dissipated to the outside of the capacitor case 4. Specifically, during use of the capacitor 1, the heat of the capacitor elements 2 is easily dissipated from the fixed portion 44 to the outside of the capacitor 1 via the fixing bus bar 3P, the direct fixing portion 33 of the fixing bus bar 3P, the rib 40, and a part of the capacitor case 4. Yet further, the portion of the capacitor case 4 where the fixed portions 44 are formed is relatively easy to secure strength. Thus, by providing, at such a portion, the rib 40 for allowing the direct fixing portion 33 of the fixing bus bar 3P to be fixed, the fixing bus bar 3P is easily fixed to the capacitor case 4 more firmly. With this, strength of the capacitor 1 as a whole can be further secured.

Yet further, the surface portion of inner surfaces of the capacitor case 4 where the rib 40 is formed, is formed to be curved to protrude to the outside of the capacitor case 4 relative to the portions adjacent to the surface portion. Thus, stiffness of a wall portion of the capacitor case 4 where the rib 40 is formed, is easily increased. In addition, the fixing bus bar 3P can be fixed to the capacitor case 4 more firmly. With this, the strength of the capacitor 1 as a whole can be further secured. In addition, since the rib 40 is provided in the recessed portion 423 formed to protrude to the outside of the capacitor case 4, the rib 40 does not obstruct the capacitor elements 2 to be housed in the capacitor case 4.

Yet further, the side wall 42 of the capacitor case 4 includes the pair of long side walls 421 facing each other, and an at least one of the long side walls 421 includes the fixed portions 44 for allowing the capacitor case 4 to be fixed to the other members. Yet further, the rib 40 and the direct fixing portion 33 are located in the first region of regions on both sides of the center position "c" between the pair of long side walls 421 in the direction in which the pair of long side walls 421 face each other (that is, Y-direction), the first region being on the side where fixation points 6 for external members is few. In this context, it is relatively difficult to secure strength in the first region. As a countermeasure, in the region of the capacitor 1 where it is relatively difficult to secure strength, the fixing bus bar 3P is directly fixed to the rib 40 of the capacitor case 4. With this, stiffness of the capacitor 1 is easily increased in the above region. As a result, the stiffness of the capacitor 1 is easily secured in the entire capacitor 1.

Yet further, as viewed from the opening side of the capacitor case 4, the direct fixing portion 33 is located on a region of the fixing bus bar 3P on the side opposite to the side where the bus-bar terminal portions 35P are formed. Thus, the fixing bus bar 3P is fixed to the other members via the bus-bar terminal portions 35P at one end, and fixed to the rib 40 of the capacitor case 4 via the direct fixing portion 33 at another end. With this, strength of the fixing bus bar 3P as a whole is increased, and hence strength of the capacitor 1 as a whole is further secured by the fixing bus bar 3P.

Yet further, the fixing bus bar 3P is arranged along the bottom wall 41 of the capacitor case 4. This enables the bottom wall 41 of the capacitor 1 to be reinforced by the fixing bus bar 3P, and hence strength of the capacitor 1 as a whole is easily secured.

Yet further, the fixing bus bar 3P includes the bus-bar bottom surface portion 31 along the bottom wall 41 of the capacitor case 4, and the bus-bar side surface portions 32 extending from the bus-bar bottom surface portion 31 and along the side wall 42 of the capacitor case 4. With this, the entire capacitor case 4 is easily reinforced, and strength of the capacitor 1 as a whole is more easily secured.

Yet further, an at least one of the rib 40 and the direct fixing portion 33 is provided at the position facing the capacitor elements 2. Thus, thermal distance from the capacitor elements 2 to the rib 40 and the direct fixing portion 33 is easily reduced, and hence the heat of the capacitor elements 2 is easily dissipated to the capacitor case 4 via the fixing bus bar 3P and the rib 40.

As described above, according to this embodiment, the capacitor for which strength is easily secured can be provided.

Modifications

The present disclosure is not limited to the embodiment described hereinabove, and is applicable to various embodiments without departing from the gist thereof.

For example, although the bus bar on the positive side is used as the fixing bus bar in the embodiment described hereinabove, the bus bars on the negative side (negative bus bars 3N according to the embodiment described hereinabove) may each be used as the fixing bus bar. Alternatively, both the bus bars on the positive side and the bus bars on the negative side may each be used as the fixing bus bar.

Further, the rib need not necessarily be locally formed at the end portion of the first long side wall in the Z-direction as in the embodiment described hereinabove, the end portion being on the side where the bottom wall is present. The rib may be formed all over the first long side wall in the Z-direction. Alternatively, the rib may be formed only on the side wall or only on the bottom wall.

Still alternatively, the shapes of the rib and the fixing bus bar are not limited as long as the fixing bus bar are directly fixed to the rib (that is, as long as the fixing bus bar includes the direct fixing portion). For example, the rib may include a portion provided to the fixing bus bar in a manner opposite to the opening side of the capacitor case in the Z-direction. In this case, the rib may be formed into a hook shape (inverted L-shape), a T-shape, or the like. In this case, the fixing bus bar can be prevented from floating in charging the sealing member into the capacitor case.

It should be understood that the present disclosure, which has been described with reference to the embodiment, is not limited to the embodiment or structures. The present disclosure also encompasses various modifications and equivalents. In addition, various combinations and forms or other combinations and forms including only one additional element, two or more additional elements, or a portion of one additional element are also included in the scope of the present disclosure or the range of ideas.

What is claimed is:

1. A capacitor comprising:
   a capacitor element that includes a pair of electrode surfaces;
   a pair of bus bars each of which is connected to a corresponding one of the pair of electrode surfaces;
   a capacitor case in which the capacitor element and the pair of bus bars are arranged; and
   a sealing member that is charged in the capacitor case and that seals the capacitor element, wherein
   the capacitor case includes a rib extended from a part of the capacitor case to an inside of the capacitor case,
   at least one of the pair of bus bars serves as a fixing bus bar, and the fixing bus bar includes a direct fixing portion to be directly fixed to the rib,
   the capacitor case includes a fixed portion for allowing the capacitor case to be fixed to another member,
   the capacitor case includes a first portion where the fixed portion is formed, and the rib is formed on an inner surface of the first portion of the capacitor case,
   an inner surface of the capacitor case includes a first surface portion where the rib is formed and a second surface portion which is adjacent to the first surface portion, and
   the first surface portion is formed to be curved to protrude outward relative to the second surface portion.

2. The capacitor according to claim 1, wherein
   the capacitor case includes:
      a bottom wall, and
      a side wall that is protruded from the bottom wall,
   the side wall includes a pair of facing wall portions facing each other,
   at least one of the pair of facing wall portions includes the fixed portion, and
   regions on both sides of a center position between the pair of facing wall portions in a direction in which the pair of facing wall portions face each other include a first region and a second region, the first region having fewer fixed points for an external member than the second region, and
   the rib and the direct fixing portion are located in the first region.

3. The capacitor according to claim 1, wherein
   the fixing bus bar includes a bus-bar terminal portion to be electrically connected to another electronic component, and
   as viewed from an opening side of the capacitor case, the direct fixing portion is located in a region of the fixing bus bar on an opposite side to a side where the bus-bar terminal portion is formed.

4. The capacitor according to claim 1, wherein
the capacitor case includes:
a bottom wall, and
a side wall that is protruded from the bottom wall, and
the fixing bus bar is arranged along the bottom wall of the capacitor case.

5. The capacitor according to claim 4, wherein
the fixing bus bar includes:
a bus-bar bottom surface portion along the bottom wall of the capacitor case, and
a bus-bar side surface portion that is extended from the bus-bar bottom surface portion and is along the side wall of the capacitor case.

6. The capacitor according to claim 1, wherein at least one of the rib and the direct fixing portion is provided at a position facing the capacitor element.

7. A capacitor comprising:
a capacitor element that includes a pair of electrode surfaces;
a pair of bus bars each of which is connected to a corresponding one of the pair of electrode surfaces;
a capacitor case in which the capacitor element and the pair of bus bars are arranged; and
a sealing member that is charged in the capacitor case and that seals the capacitor element,
the capacitor case includes a rib extended from a part of the capacitor case to an inside of the capacitor case,
at least one of the pair of bus bars serves as a fixing bus bar, and the fixing bus bar includes a direct fixing portion to be directly fixed to the rib,
an inner surface of the capacitor case includes a first surface portion where the rib is formed and a second surface portion which is adjacent to the first surface portion, and
the first surface portion is formed to be curved to protrude outward relative to the second surface portion.

8. The capacitor according to claim 3, wherein
the capacitor case includes:
a bottom wall, and
a side wall that is protruded from the bottom wall, the side wall includes a pair of facing wall portions facing each other,
at least one of the pair of facing wall portions includes a fixed portion for allowing the capacitor case to be fixed to another member, and
regions on both sides of a center position between the pair of facing wall portions in a direction in which the pair of facing wall portions face each other include a first region and a second region, the first region having fewer fixed points for an external member than the second region, and
the rib and the direct fixing portion are located in the first region.

9. The capacitor according to claim 7,
the fixing bus bar includes a bus-bar terminal portion to be electrically connected to another electronic component, and
as viewed from an opening side of the capacitor case, the direct fixing portion is located in a region of the fixing bus bar on an opposite side to a side where the bus-bar terminal portion is formed.

10. The capacitor according to claim 7,
the capacitor case includes:
a bottom wall, and
a side wall that is protruded from the bottom wall, and
the fixing bus bar is arranged along the bottom wall of the capacitor case.

11. The capacitor according to claim 10, wherein
the fixing bus bar includes:
a bus-bar bottom surface portion along the bottom wall of the capacitor case, and
a bus-bar side surface portion that is extended from the bus-bar bottom surface portion and is along the side wall of the capacitor case.

12. The capacitor according to claim 7, wherein at least one of the rib and the direct fixing portion is provided at a position facing the capacitor element.

13. A capacitor comprising:
a capacitor element that includes a pair of electrode surfaces;
a pair of bus bars each of which is connected to a corresponding one of the pair of electrode surfaces;
a capacitor case in which the capacitor element and the pair of bus bars are arranged; and
a sealing member that is charged in the capacitor case and that seals the capacitor element, wherein
the capacitor case includes a rib extended from a part of the capacitor case to an inside of the capacitor case,
at least one of the pair of bus bars serves as a fixing bus bar, and the fixing bus bar includes a direct fixing portion to be directly fixed to the rib,
the capacitor case includes a fixed portion for allowing the capacitor case to be fixed to another member,
the capacitor case includes a first portion where the fixed portion is formed, and the rib is formed on an inner surface of the first portion of the capacitor case,
the capacitor case includes:
a bottom wall, and
a side wall that is protruded from the bottom wall,
the side wall includes a pair of facing wall portions facing each other,
at least one of the pair of facing wall portions includes the fixed portion,
regions on both sides of a center position between the pair of facing wall portions in a direction in which the pair of facing wall portions face each other include a first region and a second region, the first region having fewer fixed points for an external member than the second region, and
the rib and the direct fixing portion are located in the first region.

* * * * *